(12) United States Patent
Qiu et al.

(10) Patent No.: US 12,458,048 B2
(45) Date of Patent: Nov. 4, 2025

(54) METHOD FOR PREPARING COOKED GRILLING SAUSAGE

(71) Applicants: Innovation Center of Tangtze River Delta, ZJU, Zhejiang (CN); Guangxi G. Taste Food Co., Ltd, Liuzhou (CN)

(72) Inventors: Shuang Qiu, Zhejiang (CN); Donghong Liu, Zhejiang (CN); Qihe Chen, Zhejiang (CN); Guanchen Liu, Zhejiang (CN); Yue Jin, Zhejiang (CN); Hongwen Qin, Zhejiang (CN); Tian Ding, Zhejiang (CN); Shiguo Chen, Zhejiang (CN); Ziyi Hu, Zhejiang (CN); Wenjun Wang, Zhejiang (CN)

(73) Assignees: Innovation Center of Yangtze River Delta, ZJU, Zhejiang (CN); Guangxi G. Taste Food Co., Ltd., Liuzhou (CN)

( * ) Notice: Subject to any disclaimer, the term of this patent is extended or adjusted under 35 U.S.C. 154(b) by 0 days.

(21) Appl. No.: 18/633,471

(22) Filed: Apr. 11, 2024

(65) Prior Publication Data
US 2025/0204559 A1    Jun. 26, 2025

(30) Foreign Application Priority Data
Dec. 22, 2023   (CN) .......................... 202311785155.6

(51) Int. Cl.
*A22C 11/00*   (2006.01)
*A23B 2/80*    (2025.01)
(Continued)

(52) U.S. Cl.
CPC .............. *A23L 13/65* (2016.08); *A22C 11/00* (2013.01); *A23B 2/80* (2025.01); *A23B 2/90* (2025.01); *A23L 13/76* (2016.08); *A23L 27/105* (2016.08)

(58) Field of Classification Search
CPC ........... A22C 11/00; A23L 13/65; A23L 13/76
(Continued)

(56) References Cited

U.S. PATENT DOCUMENTS 5,468,510 A * 11/1995 Christensen .......... A23L 13/426
                                                    426/574
5,939,112 A *  8/1999 Katayama .............. A23B 4/027
                                                    426/442

(Continued)

FOREIGN PATENT DOCUMENTS

CN          111109539         * 5/2020

*Primary Examiner* — David J Parsley
(74) *Attorney, Agent, or Firm* — Thomas | Horstemeyer, LLP

(57) ABSTRACT

The present disclosure provides a method for manufacturing a cooked grilling sausage. In the present disclosure, lean animal meat is subjected to a high-voltage pulsed electric field treatment to promote dissolution of salt-soluble proteins in the lean animal meat and to promote hydration of the salt-soluble proteins during curing. This process helps a resulting minced meat form a three-dimensional gel-like texture, thus making the cooked grilling sausage chewy, tender, and juicy. A raw material of the cooked grilling sausage includes lean animal meat, animal fat, sucrose, salt, Chinese liquor, complex phosphates, and crushed ice. By using the complex phosphates with a low viscosity instead of a plant-derived texture restructuring gum, a hydrophilic colloid stabilizer, and a water-retaining agent, a texture of the fresh lean animal meat can be transformed into a tender, elastic, and juicy texture of the cooked grilling sausage with a high water-holding capacity.

10 Claims, 3 Drawing Sheets

(51) Int. Cl.
   *A23B 2/90*   (2025.01)
   *A23L 13/60*  (2016.01)
   *A23L 13/76*  (2023.01)
   *A23L 27/10*  (2016.01)

(58) Field of Classification Search
   USPC .......................................... 452/30; 426/657
   See application file for complete search history.

(56) References Cited

U.S. PATENT DOCUMENTS

| | | | | |
|---|---|---|---|---|
| 5,945,152 | A * | 8/1999 | Purser | A23B 4/005 |
| | | | | 426/656 |
| 7,972,647 | B2 * | 7/2011 | Marchal | A23J 1/006 |
| | | | | 426/442 |
| 10,631,566 | B2 * | 4/2020 | Schlebusch | A23K 10/20 |
| 11,737,479 | B2 * | 8/2023 | Heck | A23L 33/17 |
| | | | | 426/656 |
| 2012/0315365 | A1 * | 12/2012 | Lee | A23L 13/65 |
| | | | | 426/574 |

* cited by examiner

METHOD FOR PREPARING COOKED GRILLING SAUSAGE

CROSS REFERENCE TO RELATED APPLICATION

This patent application claims the benefit and priority of Chinese Patent Application No. 2023117851556 filed with the China National Intellectual Property Administration on Dec. 22, 2023, the disclosure of which is incorporated by reference herein in its entirety as part of the present application.

TECHNICAL FIELD

The present disclosure relates to the technical field of meat product preparation, and in particular to a method for preparing a cooked grilling sausage.

BACKGROUND

Due to the need for meat product preservation, a main process of making sausage is to process animal meat and other raw materials into minced meat or meat paste, and then fill same into animal or artificial casings. The processing and consumption of sausages shows a long history in various regions around the world. Due to cultural and historical reasons, processing methods such as emulsification, smoking, cutting, beating, pickling, and air-drying have developed for different types of sausages.

In recent years, Taiwanese grilling sausage has become extremely popular among consumers due to its characteristics of full meat, juicy texture, moderate sweet-to-salty ratio, and convenient cooking. A process of making the Taiwanese roasted sausage includes mincing meat, mixing ingredients, beating, and sausage casing filling. Since salt-soluble proteins in the raw material meat can be dissolved in a salt solution, industrially it is generally beat or tumbled at low temperatures to promote dissolution of the salt-soluble proteins from clustered complex-grade muscle fibers and re-forming a cross-linked network, giving the sausage a fibrous texture. For example: Chinese patent CN103783556A disclosed a method for making a spicy roasted sausage. In this patent, the dissolution of proteins in pork and chicken is promoted through two tumbling processes, such that the grilling sausage shows a fibrous texture; however, the two tumbling processes take a long time, totaling 4 h to 7 h, and the spicy grilling sausage achieves a poor fibrous texture. Chinese patent CN105581346A disclosed a grain-compounded soybean protein roasted vegetarian sausage. The animal proteins are replaced with plant proteins such as starch, soybean protein isolate, and recombinant soybean protein to give the sausage a fibrous texture; although there is a short chopping and mixing time of this patent (2 h to 4 h), the obtained grain-compounded soybean protein roasted vegetarian sausage shows poor fibrous texture, insufficient meat juice, obvious beany flavor, and complex ingredients.

SUMMARY

In view of this, an objective of the present disclosure is to provide a method for preparing a cooked grilling sausage. In the present disclosure, the cooked grilling sausage by the preparation method has good fibrous texture, rich juice, and simple process.

To achieve the above objectives, the present disclosure provides the following technical solutions:

The present disclosure provides a method for preparing a cooked grilling sausage, including the following steps:
preparing a raw material, where the raw material includes lean animal meat, animal fat, sucrose, salt, Chinese liquor, a complex phosphate, and crushed ice;
subjecting the lean animal meat to a high-voltage pulsed electric field treatment and mincing in sequence to obtain a first minced meat;
mixing the first minced meat with the animal fat, the sucrose, the salt, the Chinese liquor, the complex phosphate, and the crushed ice to allow vigorous beating to obtain a second minced meat;
allowing the second minced meat to stand in a refrigerator to obtain a third minced meat; and
subjecting the third minced meat to sausage casing filling, drying, curing, and cooling in sequence to obtain the cooked grilling sausage.

In one embodiment, the raw material includes the following components in mass percentage:
64% to 68% of the lean animal meat, 12% to 16% of the animal fat, 6% to 11% of the sucrose, 0.6% to 1.5% of the salt, 0.8% to 2.0% of the Chinese liquor, 0.1% to 0.3% of the complex phosphate, and 5.7% to 12.5% of the crushed ice.

In one embodiment, the lean animal meat is one or more selected from the group consisting of lean beef, lean pork, lean lamb, and chicken breast; the animal fat is one or more selected from the group consisting of pork fat, beef fat, lamb fat, duck fat, and chicken fat; and the Chinese liquor has an alcohol content of 42° to 56°.

In one embodiment, the raw material further includes a natural spice; 1.2% to 1.5% of the natural spice is added based on the mass percentage of the lean animal meat; and the natural spice is one or more selected from the group consisting of a five-spice powder, star anise, white pepper, black pepper, cinnamon, bay leaf, clove, fennel, garlic, ginger, chili, and Sichuan peppercorn.

In one embodiment, the high-voltage pulsed electric field treatment includes: immersing the lean animal meat into a conducting solution to allow electroporation; the conducting solution is an aqueous solution of a food-grade metal salt additive, and has a conductivity of 600 µS/cm to 1,800 µS/cm and a temperature of 0° C. to 4° C.; the conducting solution and the lean animal meat are at a mass ratio of 1:1; the electroporation is conducted under a high-voltage pulsed electric field; the high-voltage pulsed electric field has a voltage of 20 kV to 30 kV, a field intensity of 1.5 kV/cm to 3 kV/cm, a frequency of 1 kHz, a pulse duration of 40 µs, and a pulse number of 100 pulses to 500 pulses; and a container for the electroporation is a treatment chamber with an electrode plate distance of 10 cm.

In one embodiment, the mincing is conducted in a mincer, and a pore plate of the mincer has a pore size of 3 mm to 18 mm.

In one embodiment, the vigorous beating is conducted at 150 r/min to 200 r/min for 20 min to 30 min in an instrument selected from the group consisting of a beater, a mixer, and a vacuum tumbler.

In one embodiment, the second minced meat is allowed to stand in the refrigerator at 0° C. to 5° C. for 4 h to 12 h.

In one embodiment, a sausage casing for the sausage casing filling is selected from the group consisting of a pig small intestine-derived sausage casing, a sheep sausage casing, a collagen sausage casing, and other edible sausage casings;
the drying is conducted at 35° C. to 70° C. for 1 h to 24 h;

the curing is conducted at 80° C. to 130° C. for 10 min to 60 min; and the cooling is conducted to reach a room temperature for 4 h to 5 h.

In one embodiment, the cooked grilling sausage after the cooling is packaged and refrigerated at −25° C. to −15° C. for 12 h to 6 months in sequence.

The present disclosure provides a method for preparing a cooked grilling sausage, including the following steps: preparing a raw material, where the raw material includes lean animal meat, animal fat, sucrose, salt, Chinese liquor, a complex phosphate, and crushed ice; subjecting the lean animal meat to a high-voltage pulsed electric field treatment and mincing in sequence to obtain a first minced meat; mixing the first minced meat with the animal fat, the sucrose, the salt, the Chinese liquor, the complex phosphate, and the crushed ice to allow vigorous beating to obtain a second minced meat; allowing the second minced meat to stand in a refrigerator to obtain a third minced meat; and subjecting the third minced meat to sausage casing filling, drying, curing, and cooling in sequence to obtain the cooked grilling sausage.

Beneficial Effects

In the present disclosure, lean animal meat is subjected to a high-voltage pulsed electric field treatment to promote dissolution of salt-soluble proteins in the lean animal meat and to promote hydration of the salt-soluble proteins during the curing. This process helps a resulting minced meat form a three-dimensional gel-like texture, thus making the cooked grilling sausage chewy, tender, and juicy.

A raw material of the cooked grilling sausage includes lean animal meat, animal fat, sucrose, salt, Chinese liquor, a complex phosphate, and crushed ice. By using the complex phosphate with a low viscosity instead of a plant-derived tissue restructuring agent (such as starch, modified starch, and soybean protein isolate), a hydrophilic colloid stabilizer, and a water-retaining agent (locust bean gum, guar gum, agar, and xanthan gum), a texture of the fresh lean animal meat may be transformed into a soft, elastic, and juicy texture of the cooked grilling sausage with a high water-holding capacity. Meanwhile, the raw material has clean ingredients with fewer types, making them more easily accepted by consumers. In addition, the preparation method may obtain the cooked grilling sausage with ruddy appearance and pure meaty texture without using additives such as color development auxiliaries or colorants.

Further, after the lean animal meat is processed by high-voltage pulsed electric field, it is beat for 20 min to 30 min. This greatly reduces the tumbling time of lean animal meat (from 5 h to 6 h to 20 min to 30 min), thereby greatly lowering production costs for enterprises.

DETAILED DESCRIPTION OF THE EMBODIMENTS

Figure 1:
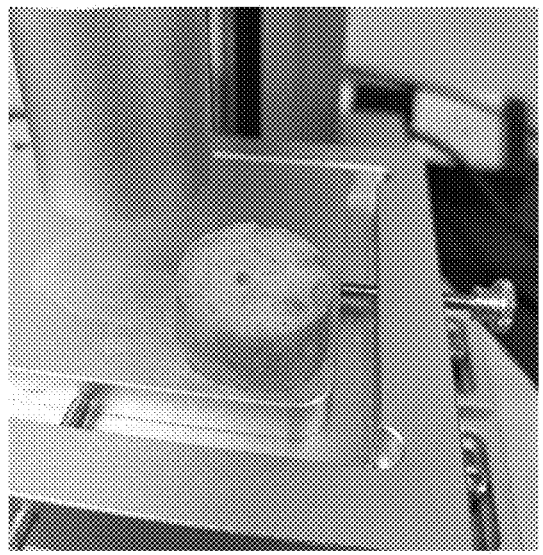
FIG. 1 shows a photo of the grilling sausage obtained in Example 1.
Figure 2:
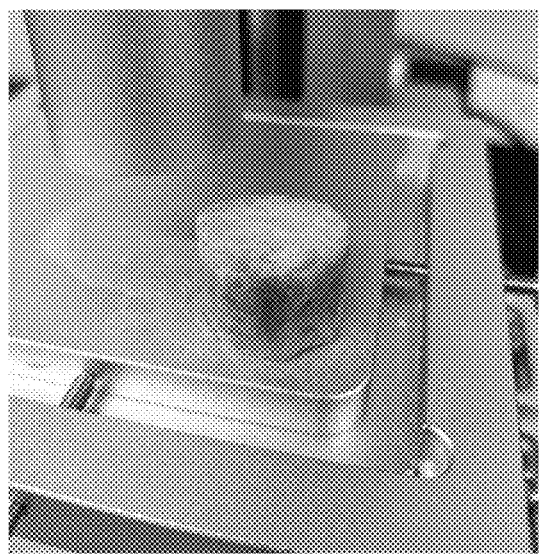
FIG. 2 shows a photo of the grilling sausage obtained in Example 2.

The present disclosure provides a method for preparing a cooked grilling sausage, including the following steps:

preparing a raw material, where the raw material includes lean animal meat, animal fat, sucrose, salt, Chinese liquor, a complex phosphate, and crushed ice;

subjecting the lean animal meat to a high-voltage pulsed electric field treatment and mincing in sequence to obtain a first minced meat;

mixing the first minced meat with the animal fat, the sucrose, the salt, the Chinese liquor, the complex phosphate, and the crushed ice to allow vigorous beating to obtain a second minced meat;

allowing the second minced meat to stand in a refrigerator to obtain a third minced meat; and subjecting the third minced meat to sausage casing filling, drying, curing, and cooling in sequence to obtain the cooked grilling sausage.

In the present disclosure, the raw materials provided herein are all preferably commercially-available products unless otherwise specified.

In the present disclosure, a raw material is prepared.

In the present disclosure, where the raw material includes lean animal meat, animal fat, sucrose, salt, Chinese liquor, a complex phosphate, and crushed ice. The lean animal meat includes preferably one or more of lean beef, lean pork, lean lamb, and chicken breast, more preferably lean pork and chicken breast. The animal fat includes preferably one or more of pork fat, beef fat, lamb fat, duck fat, and chicken fat, more preferably the pork fat. The Chinese liquor has an alcohol content of preferably 42° to 56°.

In the present disclosure, the raw material preferably includes the following components in mass percentage:

64% to 68% of the lean animal meat, 12% to 16% of the animal fat, 6% to 11% of the sucrose, 0.6% to 1.5% of the salt, 0.8% to 2.0% of the Chinese liquor, 0.1% to 0.3% of the complex phosphate, and 5.7% to 12.5% of the crushed ice.

In the present disclosure, the raw material further includes preferably a natural spice; 1.2% to 1.5% of the natural spice is preferably added based on the mass percentage of the lean animal meat; and the natural spice is preferably one or more selected from the group consisting of a five spice powder, star anise, white pepper, black pepper, cinnamon, bay leaf, clove, fennel, garlic, ginger, chili, and Sichuan peppercorn.

In the present disclosure, the lean animal meat preferably undergoes a pretreatment before being treated with high-voltage pulsed electric field. Preferably, the pretreatment includes trimming the lean animal meat to remove bones, fascia, and connective tissues, and cutting into small pieces.

In the present disclosure, the lean animal meat is subjected to a high-voltage pulsed electric field treatment and mincing in sequence to obtain a first minced meat.

In the present disclosure, the high-voltage pulsed electric field treatment preferably includes: immersing the lean animal meat in a conducting solution to allow electroporation. In the present disclosure, the conducting solution is preferably an aqueous solution of a food-grade metal salt additive, more preferably a sodium chloride aqueous solution or a potassium chloride aqueous solution. In the present disclosure, the conducting solution has a conductivity of preferably 600 μS/cm to 1,800 μS/cm and a temperature of preferably 0° C. to 4° C. In the present disclosure, the conducting solution and the lean animal meat are at a mass ratio of preferably 1:1. In the present disclosure, the electroporation is preferably conducted under a high-voltage pulsed electric field; the high-voltage pulsed electric field has a voltage of preferably 20 kV to 30 kV, a field intensity of preferably 1.5 kV/cm to 3 kV/cm, a frequency of preferably 1 kHz, a pulse duration of preferably 40 µs, and a number of pulses of 100 pulses to 500 pulses. In the present disclosure, a container for the electroporation is preferably a treatment chamber with a distance between electrode plates of 10 cm.

In the present disclosure, a moisture in the lean animal meat obtained by the high-voltage pulsed electric field treatment is controlled after the high-voltage pulsed electric field treatment is completed.

In the present disclosure, subjecting the lean animal meat to the high-voltage pulsed electric field treatment may promote the dissolution of salt-soluble proteins in the lean animal meat. The dissolved salt-soluble proteins may form a cross-linked gel network structure in the subsequent curing process, which helps to reconstruct the gel texture in the minced meat and changes the taste and water-holding capacity of the cooked grilling sausage.

In the present disclosure, the mincing is preferably conducted in a mincer, and a pore plate of the mincer has a pore size of preferably 3 mm to 18 mm.

In the present disclosure, the first minced meat is mixed with the animal fat, the sucrose, the salt, the Chinese liquor, the complex phosphate, and the crushed ice to allow vigorous beating to obtain a second minced meat.

In the present disclosure, the animal fat is preferably subjected to a pretreatment before the mixing. The pretreatment preferably includes cutting the animal fat into small pieces.

In the present disclosure, the vigorous beating is conducted at preferably 150 r/min to 200 r/min for preferably 20 min to 30 min; an instrument for the vigorous beating is a beater, a mixer, or a vacuum tumbler.

In the present disclosure, the second minced meat is allowed to stand in a refrigerator to obtain a third minced meat.

In the present disclosure, the second minced meat is allowed to stand in the refrigerator at preferably 0° C. to 5° C. for preferably 4 h to 12 h. In the present disclosure, the allowing to stand in a refrigerator may make the proteins, meat fibers, ions, and moisture in the second minced meat reach a balanced state, and may also play an antiseptic and antibacterial role.

In the present disclosure, the third minced meat is subjected to sausage casing filling, drying, curing, and cooling in sequence to obtain the cooked grilling sausage.

In the present disclosure, a sausage casing for the sausage casing filling is preferably selected from the group consisting of a pig small intestine-derived sausage casing, a sheep sausage casing, a collagen sausage casing, and other edible sausage casings. In the present disclosure, the sausage casing filling is preferably conducted in a sausage casing filling machine. During the sausage casing filling, segments are made every 10 cm by knotting to prepare a raw sausage with each segment of 50 g to 80 g.

In the present disclosure, the drying is conducted at preferably 35° C. to 70° C., more preferably 50° C. to 65° C. for preferably 1 h to 24 h, more preferably 3 h. The drying preferably includes hot air dryer drying, room temperature ventilation drying, sunlight drying, smoke curing drying, tunnel dryer drying, or hot air oven drying.

In the present disclosure, the curing is conducted at preferably 80° C. to 130° C., more preferably 90° C. to 105° C. for preferably 10 min to 60 min, more preferably 15 min to 30 min. The curing includes steaming, hot air sterilization, water bath heating, or microwave heating.

In the present disclosure, the cooling is conducted at preferably room temperature without additional heating or additional cooling for preferably 4 h to 5 h.

In the present disclosure, the cooked grilling sausage after the cooling is packaged and refrigerated in sequence. The packaging is preferably vacuum packaging, ordinary sealed packaging, or modified atmosphere packaging, more preferably the vacuum packaging. The refrigeration is conducted at preferably −25° C. to −15° C. for preferably 12 h to 6 months.

The method for preparing a cooked grilling sausage provided by the present disclosure is described in detail below with reference to the examples, but these examples may not be understood as a limitation to the protection scope of the present disclosure.

Example 1

A method for preparing a cooked grilling sausage included the following steps:

A raw material included the following components by mass percentage: 48% of lean pork, 16% of chicken breast, 16% of pig fat, 6% of sucrose, 0.6% of salt, 0.8% of Chinese liquor with an alcohol content of 56°, 0.1% of complex phosphate, and 12.5% of crushed ice.

S1: the lean pork and chicken breast were trimmed to remove fascia and connective tissues, and cut into small pieces. The small pieces of lean pork and chicken breast were immersed into a sodium chloride aqueous solution (with a conductivity of 600 µS/cm and a temperature of 0° C. to 4° C., where a total weight of the small pieces of lean pork and chicken breast and the sodium chloride aqueous solution were at a weight ratio of 1:1), and electroporation was conducted under a high-voltage pulsed electric field with a voltage of 20 kV, a field intensity of 1.5 kV/cm, a frequency of 1 kHz, a pulse duration of 40 µs, and a number of pulses of 300 pulses; a moisture in the meat pieces after pretreatment was controlled to obtain lean pork and chicken breast treated with the high-voltage pulsed electric field.

S2: the lean pork and chicken breast treated with the high-voltage pulsed electric field were minced in a mincer through a 12 mm pore plate into a first minced meat.

S3: the first minced meat was mixed with pig fat cut into small pieces, sucrose, salt, complex phosphate, Chinese liquor, and crushed ice to allow vigorous beating in a beater at 150 r/min for 25 min to obtain a second minced meat.

S4: the second minced meat was allowed to stand at 0° C. for 4 h in a refrigerator to obtain a third minced meat.

S5: the third minced meat was filled into a collagen sausage casing through a sausage casing filling machine, and then segments were made every 10 cm by knotting to prepare a raw sausage with each segment of 50 g.

S6: the raw sausage was dried in a hot air dryer at 55° C. for 3 h.

S7: a dried raw sausage was cooked in a steamer at 95° C. for 15 min.

S8: a cooked roasted sausage was cooled to a room temperature for 4 h, put into a vacuum bag to allow vacuum packaging, and a packaged cooked grilling sausage was refrigerated at −18° C. for 12 h to obtain the roasted sausage of Example 1.

Example 2

A method for preparing a cooked grilling sausage included the following steps:

A raw material included the following components by mass percentage: 56% of lean pork, 12% of chicken breast, 12% of pig fat, 10% of sucrose, 1.0% of salt, 1.0% of Chinese liquor with an alcohol content of 53°, 0.2% of complex phosphate, and 7.8% of crushed ice.

S1: the lean pork and chicken breast were trimmed to remove fascia and connective tissues, and cut into small pieces. The small pieces of lean pork and chicken breast were immersed into a sodium chloride aqueous solution (with a conductivity of 1,200 μS/cm and a temperature of 0° C. to 4° C., where a total weight of the small pieces of lean pork and chicken breast and the sodium chloride aqueous solution were at a weight ratio of 1:1), and electroporation was conducted under a high-voltage pulsed electric field with a voltage of 25 kV, a field intensity of 2.0 kV/cm, a frequency of 1 kHz, a pulse duration of 40 μs, and a number of pulses of 400 pulses; a moisture in the meat pieces after pretreatment was controlled to obtain lean pork and chicken breast treated with the high-voltage pulsed electric field.

S2: the lean pork and chicken breast treated with the high-voltage pulsed electric field were minced in a mincer through a 12 mm pore plate into a first minced meat.

S3: the first minced meat was mixed with pig fat cut into small pieces, sucrose, salt, complex phosphate, high-alcohol Chinese liquor, and crushed ice to allow vigorous beating in a beater at 180 r/min for 30 min to obtain a second minced meat.

S4: the second minced meat was allowed to stand at 3° C. for 8 h in a refrigerator to obtain a third minced meat.

S5: the third minced meat was filled into a collagen sausage casing through a sausage casing filling machine, and then segments were made every 10 cm by knotting to prepare a raw sausage with each segment of 65 g.

S6: the raw sausage was dried in a hot air dryer at 60° C. for 4 h.

S7: a dried raw sausage was cooked in a steamer at 105° C. for 20 min.

S8: a cooked roasted sausage was cooled to a room temperature for 6 h, put into a vacuum bag to allow vacuum packaging, and a packaged cooked grilling sausage was refrigerated at −20° C. for 18 h to obtain the roasted sausage of Example 2.

Example 3

A method for preparing a cooked grilling sausage included the following steps:

A raw material included the following components by mass percentage: 64% of lean pork, 16% of pig fat, 11% of sucrose, 1.5% of salt, 1.5% of Chinese liquor with an alcohol content of 53°, 0.3% of complex phosphate, and 5.7% of crushed ice.

S1: the lean pork was trimmed to remove fascia and connective tissues, and cut into small pieces. The small pieces of lean pork were immersed into a sodium chloride aqueous solution (with a conductivity of 1,800 μS/cm and a temperature of 0° C. to 4° C., where a weight of the small pieces of lean pork and the sodium chloride aqueous solution were at a weight ratio of 1:1), and electroporation was conducted under a high-voltage pulsed electric field with a voltage of 30 kV, a field intensity of 3 kV/cm, a frequency of 1 kHz, a pulse duration of 40 μs, and a number of pulses of 500 pulses; a moisture in the meat pieces after pretreatment was controlled to obtain lean pork treated with the high-voltage pulsed electric field.

S2: the lean pork treated with the high-voltage pulsed electric field was minced in a mincer through a 12 mm pore plate into a first minced meat.

S3: the first minced meat was mixed with pig fat cut into small pieces, sucrose, salt, complex phosphate, high-alcohol Chinese liquor, and crushed ice to allow vigorous beating in a beater at 200 r/min for 40 min to obtain a second minced meat.

S4: the second minced meat was allowed to stand at 5° C. for 12 h in a refrigerator to obtain a third minced meat.

S5: the third minced meat was filled into a collagen sausage casing through a sausage casing filling machine, and then segments were made every 10 cm by knotting to prepare a raw sausage with each segment of 80 g.

S6: the raw sausage was dried in a hot air dryer at 65° C. for 5 h.

S7: a dried raw sausage was cooked in a steamer at 110° C. for 25 min.

S8: a cooked roasted sausage was cooled to a room temperature for 6 h, put into a vacuum bag to allow vacuum packaging, and a packaged cooked grilling sausage was refrigerated at −20° C. for 24 h to obtain the roasted sausage of Example 3.

Comparative Example 1

A method for preparing a commercial cooked grilling sausage included the following steps:

A raw material included the following components by mass percentage: 64% of lean pork, 19% of pig fat, 6% of sucrose, 7.7% of crushed ice, 1.5% of salt, 1.5% of Chinese liquor with an alcohol content of 53°, 0.05% of Monascus red, 0.246% of complex phosphate, and 0.004% of nitrite.

S1: the lean pork was trimmed to remove fascia and connective tissues, and cut into small pieces. The pig fat was cut into small pieces to obtain a first meat ingredient.

S2: the lean pork cut into small pieces was mixed with pig fat cut into small pieces, sucrose, salt, Monascus red, complex phosphate, high-alcohol Chinese liquor, and nitrite in a vacuum tumbler to allow vacuum tumbling for 12 h to obtain a second meat ingredient.

S3: the second meat ingredient was placed into a chopper to allow chopping and mixing at 8,000 r/min for 120 min while adding crushed ice to maintain a low temperature to obtain a first minced meat.

S4: the first minced meat was allowed to stand at 4° C. for 12 h in a refrigerator to obtain a second minced meat.

S5: the second minced meat was filled into a collagen sausage casing through a sausage casing filling machine, and then segments were made every 10 cm by knotting to prepare a raw sausage with each segment of 80 g.

S6: the raw sausage was dried in a hot air dryer at 65° C. for 5 h.

S7: a dried raw sausage was cooked in a steamer at 100° C. for 25 min.

S8: a cooked roasted sausage was cooled to a room temperature for 6 h, put into a vacuum bag to allow vacuum packaging, and a packaged cooked grilling sausage was refrigerated at −20° C. for 24 h to obtain the roasted sausage of Comparative Example 1.

Comparative Example 2

A method for preparing a commercial cooked grilling sausage included the following steps:

A raw material included the following components by mass percentage: 57% of lean pork, 19% of pig fat, 6.8% of modified tapioca starch, 6.4% of sucrose, 6.7% of crushed ice, 0.8% of recombinant soybean protein, 1.5% of salt, 1.5% of Chinese liquor with an alcohol content of 53°, 0.246% of complex phosphate, 0.05% of Monascus red, and 0.004% of nitrite.

S1: the lean pork was trimmed to remove fascia and connective tissues, and cut into small pieces, while the pig fat was cut into small pieces to obtain a first meat ingredient.

S2: the lean pork cut into small pieces was mixed with pig fat cut into small pieces, sucrose, salt, modified tapioca starch, recombinant soybean protein, Monascus red, complex phosphate, high-alcohol Chinese liquor, and nitrite in a vacuum tumbler to allow vacuum tumbling for 12 h to obtain a second meat ingredient.

S3: the second meat ingredient was placed into a chopper to allow chopping and mixing at 8,000 r/min for 120 min while adding crushed ice to maintain a low temperature to obtain a first minced meat.

S4: the first minced meat was allowed to stand at 4° C. for 12 h in a refrigerator to obtain a second minced meat.

S5: the second minced meat was filled into a collagen sausage casing through a sausage casing filling machine, and then segments were made every 10 cm by knotting to prepare a raw sausage with each segment of 80 g.

S6: the raw sausage was dried in a hot air dryer at 65° C. for 5 h.

S7: a dried raw sausage was cooked in a steamer at 100° C. for 25 min.

S8: a cooked roasted sausage was cooled to a room temperature for 6 h, put into a vacuum bag to allow vacuum packaging, and a packaged cooked grilling sausage was refrigerated at −20° C. for 24 h to obtain the roasted sausage of Comparative Example 2.

Comparative Example 3

This comparative example differed from Example 1 in that the small pieces of lean pork were immersed in the sodium chloride aqueous solution for 10 min, and then minced directly by a mincer without high-voltage pulsed electric field treatment to obtain a first minced meat.

Referring to the preparation method of Example 1, the first minced meat was subjected to beating, allowing to stand, sausage casing filling, segmenting, drying, cooking, and cooling to obtain the roasted sausage of Comparative Example 3.

The hardness of the roasted sausages obtained in the Examples and Comparative Examples was tested using a full texture analysis test method; the elasticity of the roasted sausages obtained in the Examples and Comparative Examples was tested using a full texture analysis test method; the chewiness of the roasted sausages obtained in the Examples and Comparative Examples was tested using a full texture analysis test method. The results were shown in Table 1.

The moisture of the roasted sausages obtained in the Examples and Comparative Examples was tested using a method in GB/T 9695.15-2008, and the color of the roasted sausages obtained in the Examples and Comparative Examples was tested using a handheld colorimeter. The results were shown in Table 2.

TABLE 1

Test results of texture (TPA) for roasted sausages obtained in Examples and Comparative Examples

| Index | Example 1 | Example 2 | Example 3 | Comparative Example 1 | Comparative Example 2 | Comparative Example 3 |
|---|---|---|---|---|---|---|
| Hardness (N) | 75.6 ± 7.2 | 75.0 ± 2.5 | 74.0 ± 5.8 | 80.2 ± 4.0 | 78.0 ± 6.1 | 56.4 ± 3.7 |
| Elasticity (mm) | 4.2 ± 0.7 | 4.4 ± 1.0 | 4.6 ± 0.3 | 4.4 ± 1.2 | 4.0 ± 0.7 | 4.2 ± 0.1 |
| Chewiness (mj) | 257.9 ± 7.2 | 278.1 ± 5.7 | 284.0 ± 3.2 | 276.3 ± 11.3 | 272.3 ± 1.5 | 248 ± 4.0 |

TABLE 2

Test results of moisture and color for roasted sausages obtained in Examples and Comparative Examples

| Index | Example 1 | Example 2 | Example 3 | Comparative Example 1 | Comparative Example 2 | Comparative Example 3 |
|---|---|---|---|---|---|---|
| Moisture content (%) | 52.1% ± 1.7 | 55.4% ± 0.9 | 55.7% ± 0.1 | 50.7% ± 2.6 | 52.4% ± 7.2 | 50.4% ± 1.3 |
| Color difference (ΔE) | 13.3 ± 0.7 | 14.7 ± 1.0 | 15.9 ± 0.3 | 13.2 ± 0.6 | 19.8 ± 1.2 | 12.5 ± 0.3 |

Table 1 shows that there is no significant difference between the hardness, elasticity, and chewiness of the cooked grilling sausages obtained in the examples and the roasted sausages obtained in the comparative examples. The possible reasons are: the high-voltage pulsed electric field treatment promoted dissolution of salt-soluble proteins in lean animal meat, reduces the time required during the tumbling, and promotes hydration of the salt-soluble proteins during the cooking, thus forming a three-dimensional gel network.

Figure 3:
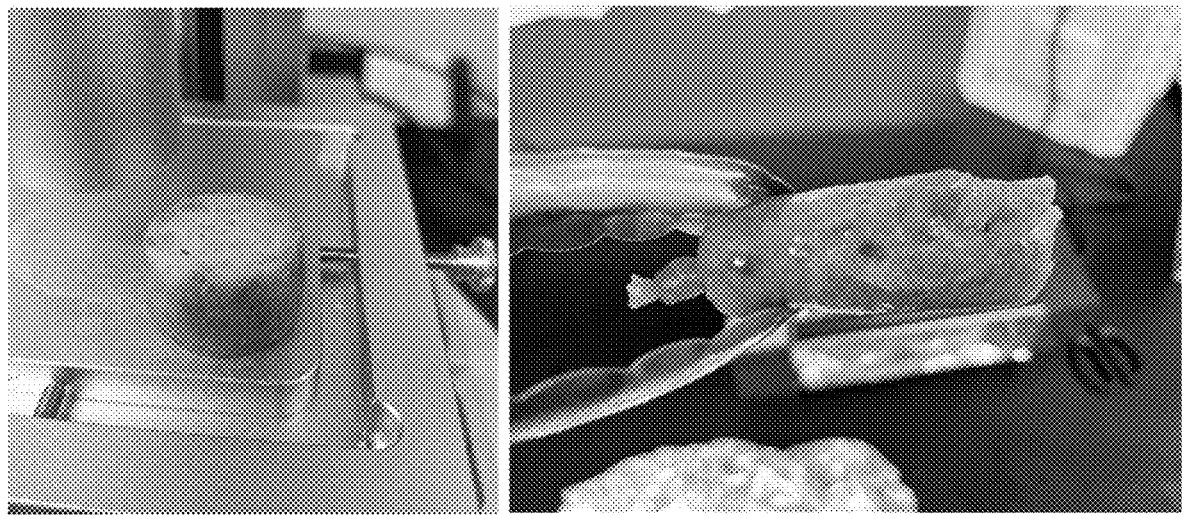
FIG. 3 shows a photo of the grilling sausage obtained in Example 3.
Figure 4:
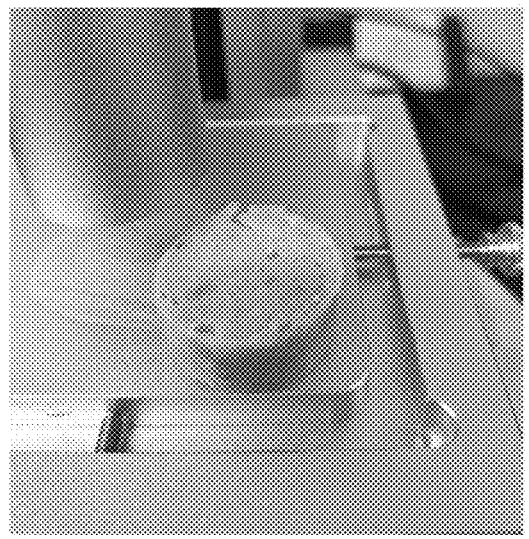
FIG. 4 shows a photo of the grilling sausage obtained in Comparative Example 1.
Figure 5:
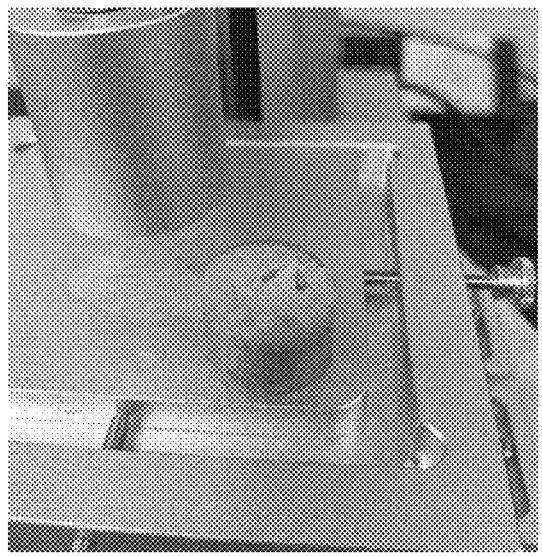
FIG. 5 shows a photo of the grilling sausage obtained in Comparative Example 2.

FIG. 1 to FIG. 6 show photos of roasted sausages obtained in Examples and Comparative Examples. As shown in FIG. 1 to FIG. 6: Examples 1 to 3 are similar to Comparative Examples 1 to 2. After two extrusion texture tests, the roasted sausage shows desirable elasticity, muscle protein fibrous texture, and juicy texture (FIG. 3). Compared with Comparative Example 2 which added texture improvers such as modified tapioca starch and recombinant soybean protein, there is no significant difference in texture properties and taste. As the intensity of electric field treatment such as voltage, field intensity, and number of pulses increased during high-voltage pulsed electric field treatment, the chewiness of Examples 1 to 3 increased and is closer to Comparative Example 2 with the addition of a texture improver. This indicates that pulsed electric field treatment promotes the dissolution of salt-soluble proteins and the reorganization of protein gel network.

Examples 1 to 3 exhibits a natural appearance of processed meat products (FIG. 3), and there is no significant difference in color compared to Comparative Examples 1 and 2 that add with color-developing agents such as nitrite and Monascus red.

Figure 6:
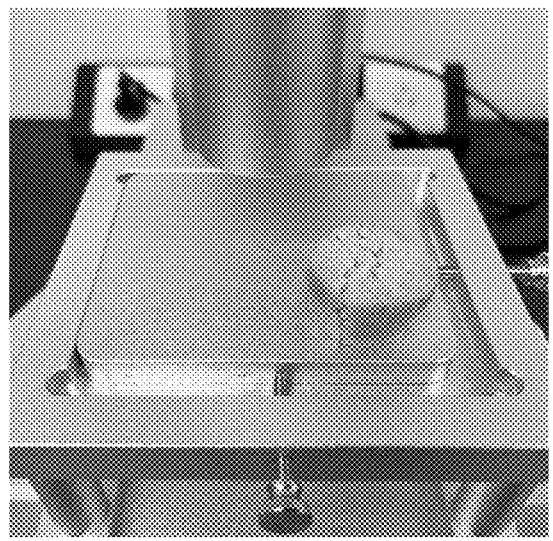
FIG. 6 shows a photo of the grilling sausage obtained in Comparative Example 3.

As shown in FIG. 6, Comparative Example 3 only adopted salt water immersion and did not apply electric field treatment compared with Examples 1 to 3. The texture of the obtained final product has low hardness and poor chewiness, and its sensory properties shows that the meat has loose texture with a whitish appearance, lacking flesh color.

In the present disclosure, by using the complex phosphate with a low viscosity instead of plant-derived tissue restructuring agents such as starch/modified starch, soybean protein isolate, or hydrophilic colloid stabilizers such as locust bean gum, guar gum, agar, xanthan gum, and water-retaining agents, a texture of the fresh lean animal meat can be transformed into a soft, elastic, and juicy texture of the cooked grilling sausage with a high water-holding capacity.

In preparing the cooked grilling sausage, the high-voltage pulsed electric field treatment of lean animal meat greatly reduces the pork tumbling time (from 5 h to 6 h to 20 min to 30 min), thereby greatly reducing production costs for enterprises and optimizing the necessary tumbling pretreatment for meat products. This technology can also be applied in the processing of meat products such as roast chicken, roast duck, sauced meat, and sausages in the future.

The cooked grilling sausage of the present disclosure does not use additives such as color development aids and colorants, such that the cooked grilling sausage with a ruddy appearance and pure taste can be obtained.

The above descriptions are merely preferred implementations of the present disclosure. It should be noted that a person of ordinary skill in the art may further make several improvements and modifications without departing from the principle of the present disclosure, but such improvements and modifications should be deemed as falling within the protection scope of the present disclosure.

What is claimed is:

1. A method for preparing a cooked grilling sausage, comprising the following steps:
   preparing raw materials, wherein the raw material comprises the following components in mass percentage: 64% to 68% of the lean animal meat, 12% to 16% of the animal fat, 6% to 11% of the sucrose, 0.6% to 1.5% of the salt, 0.8% to 2.0% of the Chinese liquor, 0.1% to 0.3% of the complex phosphates, and 5.7% to 12.5% of the crushed ice;
   subjecting the lean animal meat to a high-voltage pulsed electric field treatment and mincing in sequence to obtain a first minced meat;
   mixing the first minced meat with the animal fat, the sucrose, the salt, the Chinese liquor, the complex phosphates, and the crushed ice to allow vigorous beating to obtain a second minced meat;
   allowing the second minced meat to stand in a refrigerator to obtain a third minced meat; and
   subjecting the third minced meat to sausage casing filling, drying, curing, cooking, and cooling in sequence to obtain the cooked grilling sausage.

2. The method according to claim 1, wherein the lean animal meat is one or more selected from the group consisting of lean beef, lean pork, lean lamb, and chicken breast; the animal fat is one or more selected from the group consisting of pork fat, beef fat, lamb fat, duck fat, and chicken fat; and the Chinese liquor has an alcohol content of 42% (v/v) to 56% (v/v).

3. The method according to claim 1, wherein the raw material further comprises a natural spice; 1.2% to 1.5% of the natural spice is added based on the mass percentage of the lean animal meat; and the natural spice is one or more selected from the group consisting of a five spice powder, star anise, white pepper, black pepper, cinnamon, bay leaf, clove, fennel, garlic, ginger, chili, and Sichuan peppercorn.

4. The method according to claim 1, wherein the high-voltage pulsed electric field treatment comprises: immersing the lean animal meat into a conducting solution to allow electroporation; the conducting solution is an aqueous solution of a food-grade metal salt additive, and has a conductivity of 600 µS/cm to 1,800 µS/cm and a temperature of 0° C. to 4° C.; the conducting solution and the lean animal meat are at a mass ratio of 1:1; the electroporation is conducted under a high-voltage pulsed electric field; the high-voltage pulsed electric field has a voltage of 20 kV to 30 kV, a field intensity of 1.5 kV/cm to 3 kV/cm, a frequency of 1 kHz, a pulse duration of 40 us, and a pulse number of 100 pulses to 500 pulses; and a container for the electroporation is a treatment chamber with an electrode plate distance of 10 cm.

5. The method according to claim 1, wherein the mincing is conducted in a mincer, and a pore plate of the mincer has a pore size of 3 mm to 18 mm.

6. The method according to claim 1, wherein the vigorous beating is conducted at 150 r/min to 200 r/min for 20 min to 30 min in an instrument selected from the group consisting of a beater, a mixer, and a vacuum tumbler.

7. The method according to claim 1, wherein the second minced meat is allowed to stand in the refrigerator at 0° C. to 5° C. for 4 h to 12 h.

8. The method according to claim 1, wherein a sausage casing for the sausage casing filling is selected from the group consisting of a pig small intestine-derived sausage casing, a sheep sausage casing, and a collagen sausage casing;
   the drying is conducted at 35° C. to 70° C. for 1 h to 24 h;

the curing is conducted at 80° C. to 130° C. for 10 min to 60 min; and the cooling is conducted to reach a room temperature for 4 h to 5 h.

9. The method according to claim 1, wherein the cooked grilling sausage after the cooling is packaged and refrigerated at −25° C. to −15° C. for 12 h to 6 months in sequence.

10. The method according to claim 9, wherein a sausage casing for the sausage casing filling is selected from the group consisting of a pig small intestine-derived sausage casing, a sheep sausage casing, a collagen sausage casing, and other edible sausage casings;

the drying is conducted at 35° C. to 70° C. for 1 h to 24 h;

the curing is conducted at 80° C. to 130° C. for 10 min to 60 min; and the cooling is conducted to reach a room temperature for 4 h to 5 h.

* * * * *